United States Patent
Radhakrishnan et al.

(10) Patent No.: US 8,412,672 B1
(45) Date of Patent: Apr. 2, 2013

(54) HIGH AVAILABILITY NETWORK STORAGE SYSTEM INCORPORATING NON-SHARED STORAGE SUITABLE FOR USE WITH VIRTUAL STORAGE SERVERS

(75) Inventors: Prashanth Radhakrishnan, Bangalore (IN); Vaibhav Singh, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 149 days.

(21) Appl. No.: 12/877,890

(22) Filed: Sep. 8, 2010

(51) Int. Cl.
*G06F 17/30* (2006.01)
(52) U.S. Cl. ........................................ 707/609
(58) Field of Classification Search .................. 707/609
See application file for complete search history.

(56) References Cited

U.S. PATENT DOCUMENTS

| | | | |
|---|---|---|---|
| 7,640,292 B1 | 12/2009 | Smoot | |
| 2005/0228835 A1* | 10/2005 | Roa | 707/204 |
| 2006/0155748 A1* | 7/2006 | Zhang et al. | 707/102 |
| 2008/0104216 A1 | 5/2008 | Ponnappan et al. | |
| 2008/0222375 A1 | 9/2008 | Kotsovinos et al. | |
| 2008/0313364 A1 | 12/2008 | Flynn et al. | |
| 2010/0332373 A1 | 12/2010 | Crabtree et al. | |

OTHER PUBLICATIONS

Co-pending U.S. Appl. No. 12/877,873, filed Sep. 8, 2010.
Non-Final Office Action Mailed Oct. 16, 2012 in Co-Pending U.S. Appl. No. 12/877,873 of Radhakrishnan, P., filed Sep. 8, 2010.
Network Appliance™ Sync Mirror™ Software, Network Applicance, Inc. (2002) 2 pages.
Infrastructure Solution—Maintain Availability of Vital Business Data, NetApp (2009) 2 pages.

* cited by examiner

Primary Examiner — Baoquoc N To
(74) Attorney, Agent, or Firm — Perkins Coie LLP (57) ABSTRACT

A technique is disclosed for providing high availability (HA) capability with a plurality of storage servers, which may be virtual storage servers (VSSs), in a shared-nothing storage environment. The technique uses a proxy mechanism to route requests originating at one storage server to an HA partner storage server, where the proxy is implemented inside a VSS logically below the RAID layer. The technique also involves distributing non-shared storage devices "owned" by a storage server so that existing storage device-based heartbeat and fencing mechanisms can function unmodified for HA VSSs in shared-nothing environments. For example, a third, external host can be used to provide and export its non-shared storage to first and second storage servers, where the first and second storage servers do not own the non-shared storage on their local physical host machine.

26 Claims, 10 Drawing Sheets

HIGH AVAILABILITY NETWORK STORAGE SYSTEM INCORPORATING NON-SHARED STORAGE SUITABLE FOR USE WITH VIRTUAL STORAGE SERVERS

FIELD OF THE INVENTION

At least one embodiment of the present invention pertains to network storage systems, and more particularly, to a network storage system incorporating high availability direct attached storage.

BACKGROUND

Network storage is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

There are two important trends today in the field of network storage. First, companies today more commonly package their products as virtual storage servers (VSSs) instead of as dedicated (special-purpose) physical storage servers. This trend is driven primarily by cost considerations (i.e., it allows lower cost, generic server hardware to be used) and made feasible by the widespread use of system virtualization software in data centers. Second, data centers are increasingly starting to use "shared-nothing" storage environments, i.e., environments in which separate physical hosts do not share their storage with each other. For example, in place of dedicated network storage servers, the copious direct-attached storage (DAS) in commodity servers can be pooled to provide "virtual" network storage systems. This trend is due to the higher capacities of today's hard drives, as well as a desire not to waste available storage space provided by these commodity servers.

Many storage servers today implement some form of high-availability (HA) capability, which is the capability to provide uninterrupted service in the event of a failure of one or more components in the system. HA capability normally involves running multiple redundant storage servers attached to mutually shared storage. However, implementing HA capability becomes problematic when virtual storage servers are employed with shared-nothing storage. In particular, HA capability relies upon storage being mutually shared between two or more redundant storage servers. In the prior art, because DAS is not used, each storage server has the ability to access directly the storage owned by the other storage server(s) (its HA partners(s)). Such sharing is difficult if not impossible when DAS storage is used, however, since a storage server has no direct access to another storage server's DAS storage. Some potential solutions to this problem require modifications to the HA mechanisms or the use of additional pieces of software, thus undesirably increasing the complexity of the overall solution.

SUMMARY

The technique introduced here is directed to providing HA capability with a plurality of storage servers, which may be VSSs, in a "shared nothing" storage environment, i.e., by using non-shared storage. "Non-shared" storage can be DAS, for example, although there are other possible scenarios/configurations in which storage may not be shared between physical hosts. A configuration or technique that includes VSSs which use DAS and are configured with HA capability is called "VSS-HA DAS" herein. In some embodiments the technique involves two main aspects. First, it involves using a proxy which routes requests originating at one storage server to another storage server, where the proxy is implemented inside the storage server logically below the RAID layer. This enables RAID-level mirroring to be leveraged to achieve inter-host replication. Second, the technique involves distributing the storage devices "owned" by a storage server in a manner such that existing storage device-based heartbeat and fencing mechanisms can function unmodified for HA virtual storage servers in shared-nothing storage environments. Specifically, a third, external host is used to provide and export its DAS storage to both the first storage server and the second storage server, where neither the first storage server nor the second storage server "owns" the DAS storage of its local physical host machine. By "owning" a particular set of storage, what is meant is having primary write control over that set of storage.

In certain embodiments, HA storage owned by the first server is located on a different physical host from the first server, and HA storage owned by the second server is located on a different physical host from the second server. Further, the HA storage owned by the first server can be distributed between the second server and the third host, and the HA storage owned by the second server can be distributed between the first server and the third host. Additionally, a storage device proxy logically below the RAID layer may be used in each of the first server, the second server and the third host, to proxy data communications between hosts.

The technique introduced here thereby allows HA capability to be provided with storage servers, such as VSSs, based on DAS storage, in a manner that does not require modifications to existing HA mechanisms or the use of additional pieces of software external to the VSS (thus not unduly increasing the complexity of the overall solution).

Other aspects of the technique will be apparent from the accompanying figures and detailed description. This summary is provided to introduce in a simplified form certain concepts that are further described in the Detailed Description below. This summary is not intended to identify essential features of the claimed subject matter or to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
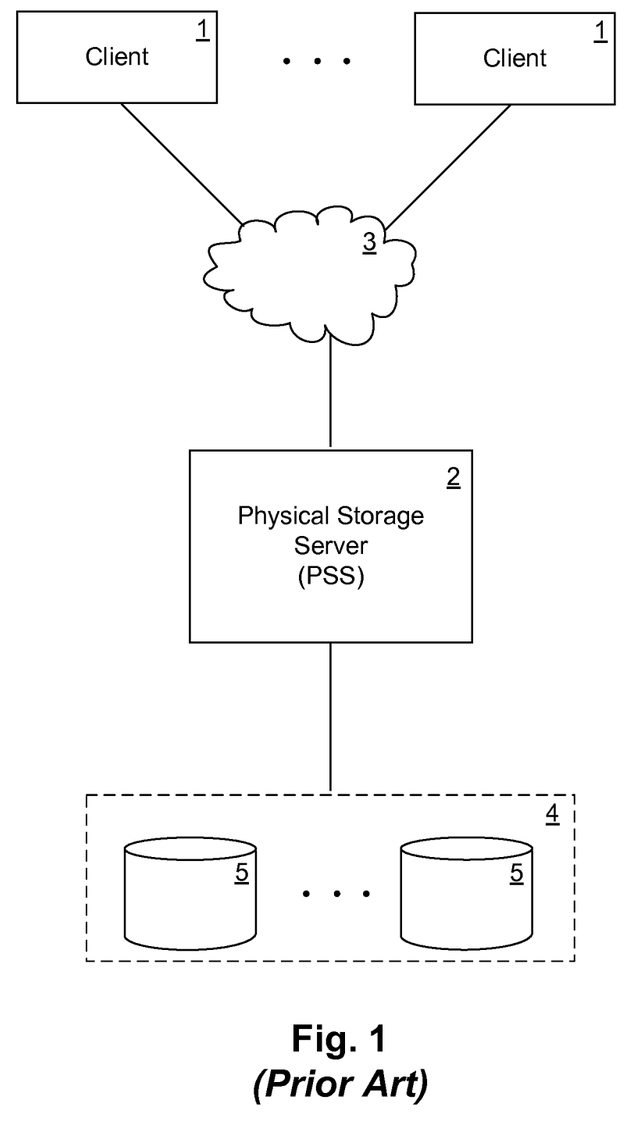
FIG. 1 illustrates a network storage environment based on the physical storage server.

FIG. 1 shows a conventional network storage environment, based on a traditional physical storage server (PSS). In FIG. 1, a PSS 2 is coupled to a storage subsystem 4 that includes non-volatile mass storage devices 5, and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the storage subsystem 4 is managed by the PSS 2. The PSS 2 receives and responds to various read and write requests from the clients 1, directed to data stored in or to be stored in the storage subsystem 4. The mass storage devices 5 in the storage subsystem 4 can be, for example, conventional magnetic or optical disks or tape drives; alternatively, they can be non-volatile solid-state memory, such as flash memory or solid-state drives (SSDs). The mass storage devices 5 can be organized as a Redundant Array of Inexpensive Devices (RAID), in which case the storage server 2 accesses the storage subsystem 4 using one or more well-known RAID protocols. Further, in accordance with the techniques introduced here, the PSS 2 includes a storage operating system (not shown). The storage operating system is a functional module which controls most of the operations of the PSS 2, including servicing client initiated data access requests.

The PSS 2 may be a file-level server such as used in a NAS environment, a block-level storage server such as used in a SAN environment, or a storage server which is capable of providing both file-level and block-level data access. Further, although the PSS 2 is illustrated as a single unit in FIG. 1, it can have a distributed architecture. For example, the PSS 2 can include a physically separate network module (e.g., "N-blade") and data module (e.g., "D-blade") (not shown), which communicate with each other over an external interconnect.

Figure 2:
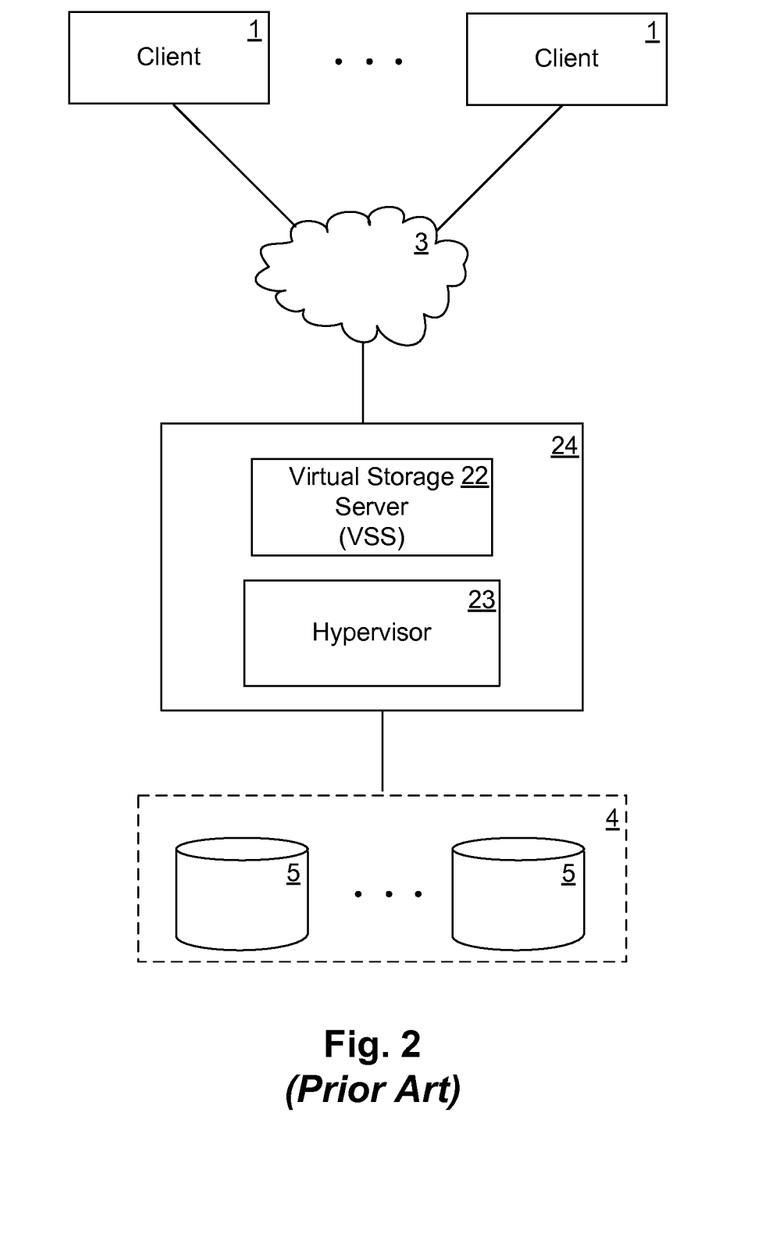
FIG. 2 illustrates a network storage environment based on a virtual storage server (VSS).

FIG. 2 illustrates a network storage environment similar to that of FIG. 1, except that a virtual storage server (VSS) 22 is employed rather than a dedicated PSS. As noted, this approach may be useful in reducing costs, because the VSS 22 runs on top of a hypervisor 23 within a commodity (inexpensive) physical server 24. An example of a suitable hypervisor may be, for example, ESX from VMWARE®. For purposes of this description, it may be assumed that the VSS operates in a manner essentially identical to that of the PSS in all significant respects.

Figure 3:
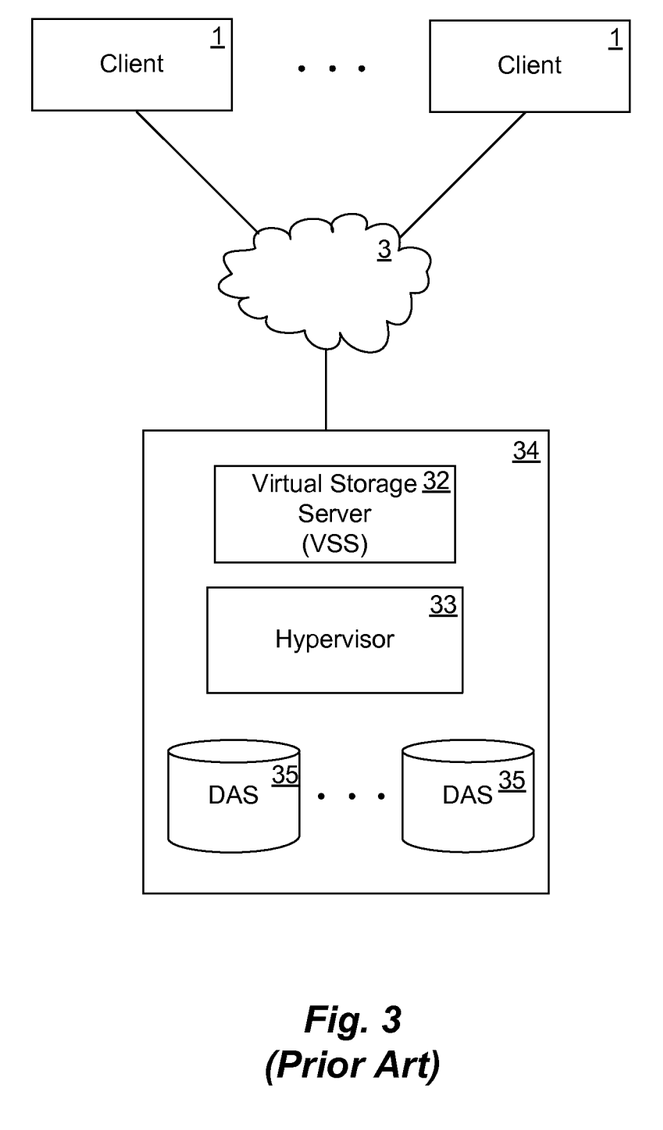
FIG. 3 illustrates a network storage environment based on a VSS and the use of DAS storage.

As noted above, it is becoming more common to employ pooled DAS storage in storage configurations of the type represented in FIG. 2. FIG. 3 illustrates an example of such an approach, which can be contrasted with the architecture of FIG. 1 in which DAS storage is not used. VSS 32 runs on top of a hypervisor 33 within a commodity (inexpensive) physical server 34, which includes DAS storage devices (e.g., disks) 35.

Figure 4:
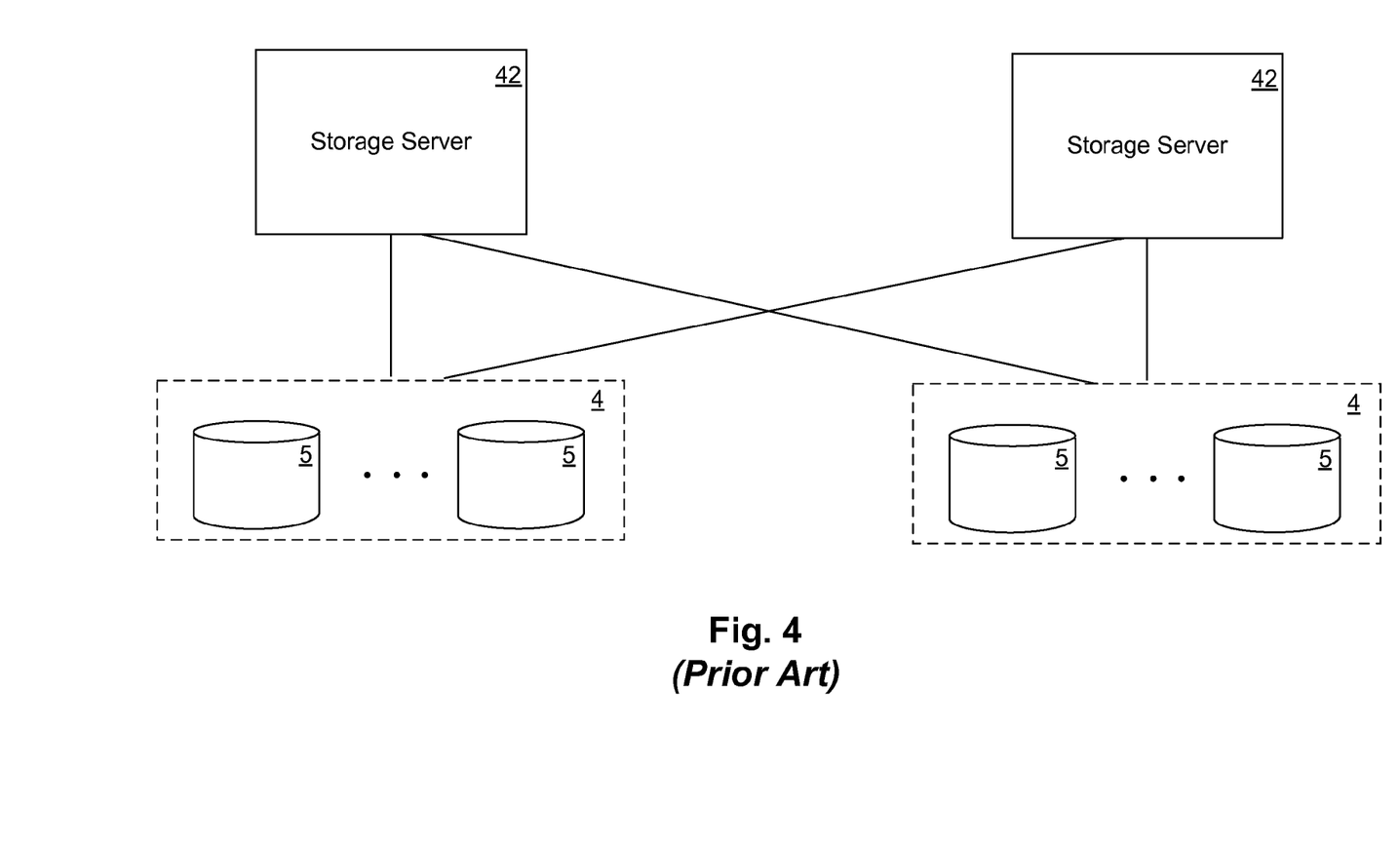
FIG. 4 illustrates a conventional CFO-type HA configuration.

Also as noted above, it is common for multiple storage servers to be employed in a HA architecture. One form of HA technique is called cluster failover (CFO), an illustrative configuration of which is shown in FIG. 4 (for simplicity the clients and client-side network are not shown). As shown, each storage server 42 has direct access to its own storage devices as well as those of its CFO partner. CFO refers to a capability in which two or more interconnected storage servers are both active at the same time, such that if one storage server fails or is taken out of service, that condition is detected by the other, which then assumes the functionality of the inoperative storage server (as well as continuing to service its own client requests), through a process called "takeover". If and when the failed storage server comes back online, it can resume its prior functionality through a process called "giveback". This technique can be implemented by employing certain versions of the Data ONTAP® storage operating system included in storage server products available from NETAPP®, Inc. ("NETAPP") of Sunnyvale, Calif. The CFO mechanism implemented by Data ONTAP is called "ONTAP CFO" herein.

Figure 5:
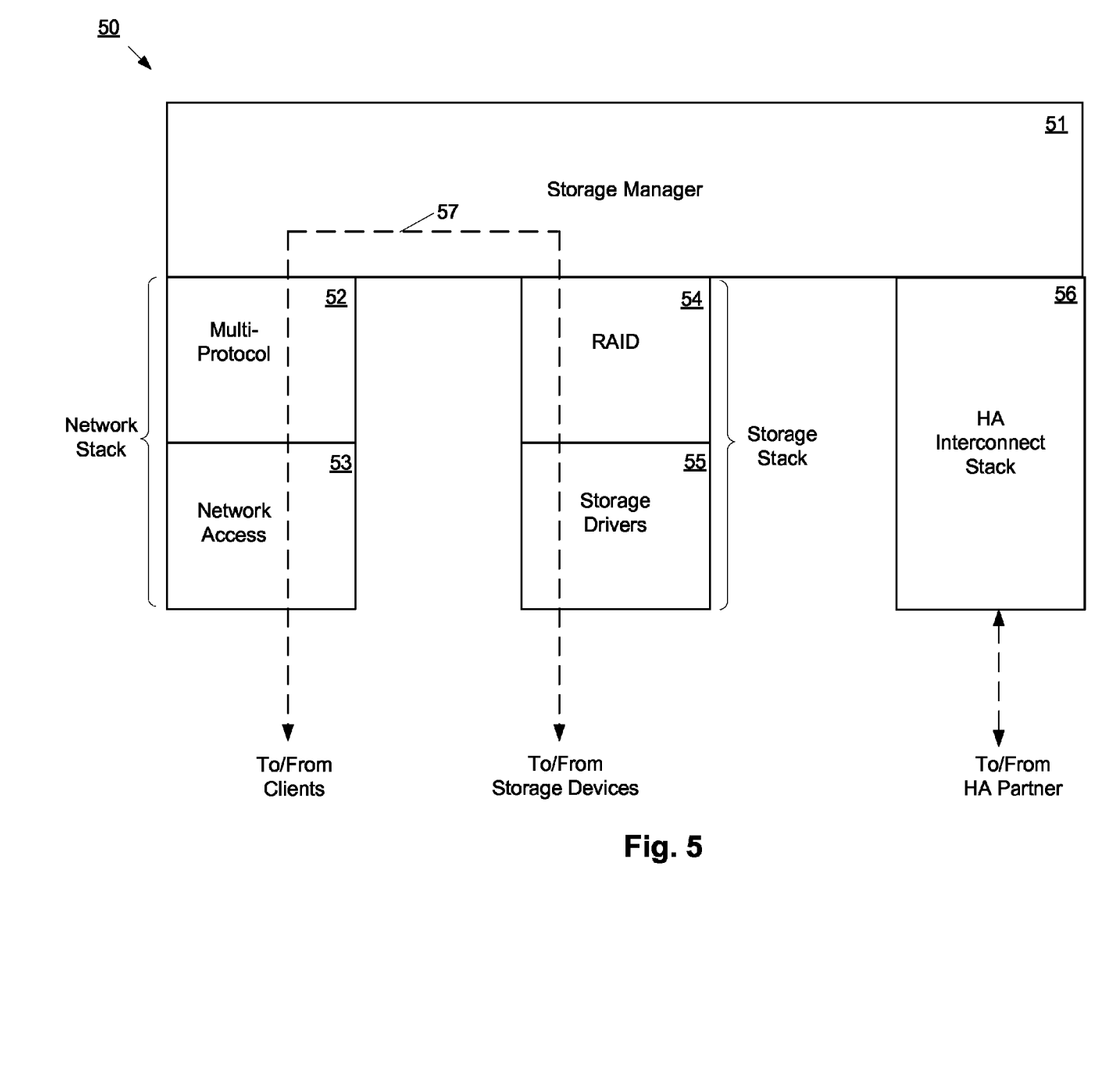
FIG. 5 illustrates an example of an architecture of a storage operating system in a storage server used in an HA configuration.

FIG. 5 illustrates an example of a storage operating system that can be used to provide CFO functionality. In the illustrated embodiment, the storage operating system 50 includes several modules, or "layers". These layers include a storage manager 51, which is the core functional element of the storage operating system 50. The storage manager 51 imposes a structure (e.g., a hierarchy) on the data stored by its host server, and services read and write requests from clients.

To allow the host storage server to communicate over a network (e.g., with clients), the storage operating system 50 also includes a multiprotocol layer 32 and a network access layer 53, logically "under" the storage manager 51. The multiprotocol 52 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 53 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

To allow the host storage server to communicate with its storage subsystem, the storage operating system 50 includes a RAID layer 54 and an associated storage driver layer 55 logically under the storage manager 51. The RAID layer 54 implements a higher-level RAID algorithm, such as RAID-0, RAID-1, RAID-4, RAID-5 or RAID-6. The storage driver layer 55 implements a lower-level storage device access protocol, such as Fibre Channel Protocol (FCP) or small computer system interface (SCSI). The RAID layer 54 and the storage drivers 55 are collectively called the "storage stack," whereas the multiprotocol layer 52 and the network access layer 53 are collectively called the "network stack." Also shown is the data path 57 between the clients and storage devices.

The storage operating system 50 can have a distributed architecture. For example, the multiprotocol layer 52 and network access layer 53 can be implemented in an N-module (e.g., N-blade) while the other components of the storage operating system 50 (e.g., storage manager 51, RAID layer 54 and storage drivers 55) are implemented in a separate D-module (e.g., D-blade). In such cases, the N-module and D-module communicate with each other (and, possibly, with other N- and D-modules) through some form of physical interconnect and together form a storage server "node". Such a storage server node can be connected with one or more other storage server nodes to form a highly scalable storage server cluster.

The storage operating system 50 additionally includes an HA interconnect stack 56, which controls CFO related communications between the host storage server and its cluster partner(s). Further details of an HA interconnect stack are discussed below by way of example in FIG. 7.

The CFO approach requires that each partnered storage server have direct access to the (external) storage owned by its CFO partner. This approach, therefore, is not compatible "as is" with the use of DAS. The technique introduced here, therefore, is directed to enabling the use of DAS in the context of VSS-based HA, by leveraging existing technologies in order to reduce the number of needed modifications and complexity.

Before discussing the technique introduced here, consider the following two alternative approaches that could potentially be used instead. One is by modifying an existing HA mechanism. In this approach, the existing HA mechanism is suitably modified to work in a shared-nothing storage environment. A major drawback of this approach is that it would involve a significant alteration of the HA design and thus fail to leverage the design and implementation solidarity of the existing HA mechanism. Furthermore, it would involve greater software development costs and time to market the product.

The second alternative approach is to use additional external software. In this approach, it is unnecessary to modify the HA mechanism, but instead, additional external software such as an iSCSI software initiator and target are used to transform a shared-nothing environment into a shared storage environment. A major drawback of this approach is that it expands the fault domain of the system, adds to its overall complexity and potentially leads to inferior performance.

In contrast, the technique introduced here does not have these disadvantages. It helps in the creation of an HA product that can run as a VSS in a shared-nothing (e.g., DAS) storage environment with the following attributes:

First, the technique can be based on an HA mechanism used in a traditional storage server, such as ONTAP CFO. Thus, the technique is largely hypervisor-/virtual machine-agnostic (i.e., the technique is readily portable across different hypervisor platforms, such as ESX, XEN®, Hyper-V, etc.) and permits the reuse of "tried and tested" technologies. Further, the technique requires no modification to the core HA mechanism. As such, it involves significantly less development cost and fast time-to-market. In addition, the technique introduced here requires no third-party services (e.g., VMWARE HA or VMWARE FT) or additional external pieces of software (e.g., iSCSI target and initiator); thus, it involves significantly less complexity than such an alternative solution.

The technique introduced here has two main aspects: 1) a mechanism to proxy storage device traffic between VSSs, and 2) a particular manner of VSS configuration and storage device placement. These aspects shall now be discussed in detail.

Device Proxy

As noted above, it is desirable to be able to use an existing HA mechanism with little or no modification. HA in the form of ONTAP CFO requires that all storage devices (e.g., disks)—i.e., those that are owned by the local node and those that are owned by the partner node(s)—are accessible to each node. For a VSS-HA DAS configuration, a device proxy is used to provide CFO with access to the storage devices located on the remote hosts.

To provide the physical host failure tolerance normally associated with HA, stored data is replicated across hosts. The replication can be achieved by employing an existing RAID-level mirroring product. One suitable example of such a product is NETAPP's SYNCMIRROR® application, which is included in certain versions of NETAPP's Data ONTAP storage operating system. Such a mirroring application normally "expects" direct access to both local storage and the cluster partner's storage. This can be achieved in effect with the above-mentioned device proxy mechanism, if the proxy mechanism is implemented logically below the RAID layer 54. This scenario is illustrated conceptually in FIG. 6.

Figure 6:
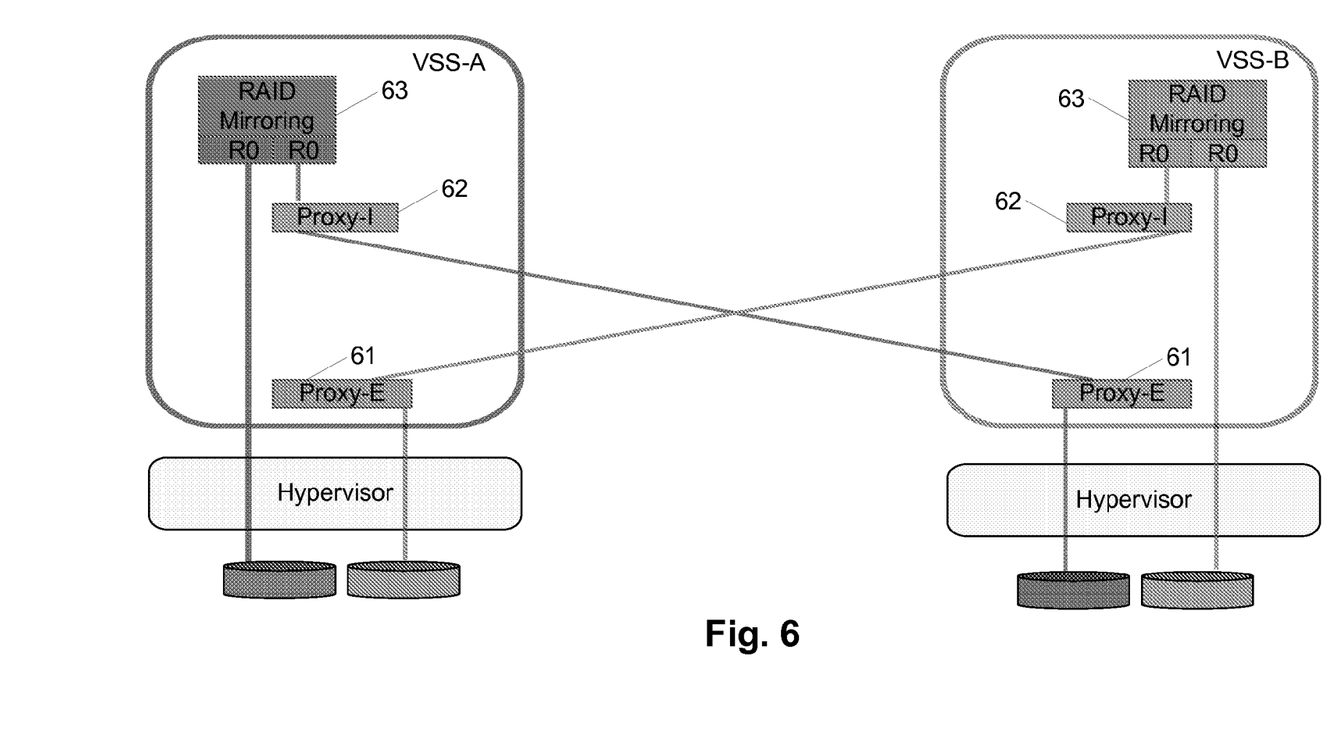
FIG. 6 shows two VSSs mutually exporting storage devices to each other by use of sub-RAID layer storage device proxies.

In FIG. 6, the two VSSs, VSS-A and VSS-B, mutually export storage devices to each other. By layering a mirroring aggregate over a local RAID-0 ("R0") plex and a "proxied" RAID-0 ("R0") plex, it is possible to achieve data replication across hosts. The term "aggregate," as used herein, refers to a logical aggregation of physical storage, i.e., a logical container for a pool of storage, combining one or more physical mass storage devices (e.g., disks) or parts thereof into a single logical storage object, which contains or provides storage for one or more other logical data sets at a higher level of abstraction (e.g., volumes). The term "plex," as used herein, refers to a subset of an aggregate in a data mirroring environment. Normally a mirroring environment includes a source plex and a mirror plex. If the mirror is broken, the source plex and the mirror plex become independent aggregates. An example of a plex is a RAID group.

As shown in FIG. 6, the device proxy in one embodiment contains two components in each storage server: an export component, "proxy-E" 61, and an import component, "proxy-I" 62. A proxy-E 61 exports DAS storage devices of the local host to remote hosts. A proxy-I 62, on the other hand, sits in the storage stack as a virtual host bus adapter (HBA) driver, imports the remote DAS storage devices exported by the remote cluster partner(s), and presents them to the rest of the local subsystems, such as RAID, CFO, etc. As can be seen, proxy-E 61 and proxy-I 62 both sit logically below the RAID mirroring layer 63, which in certain embodiments is implemented within the RAID layer 54 itself.

Figure 7:
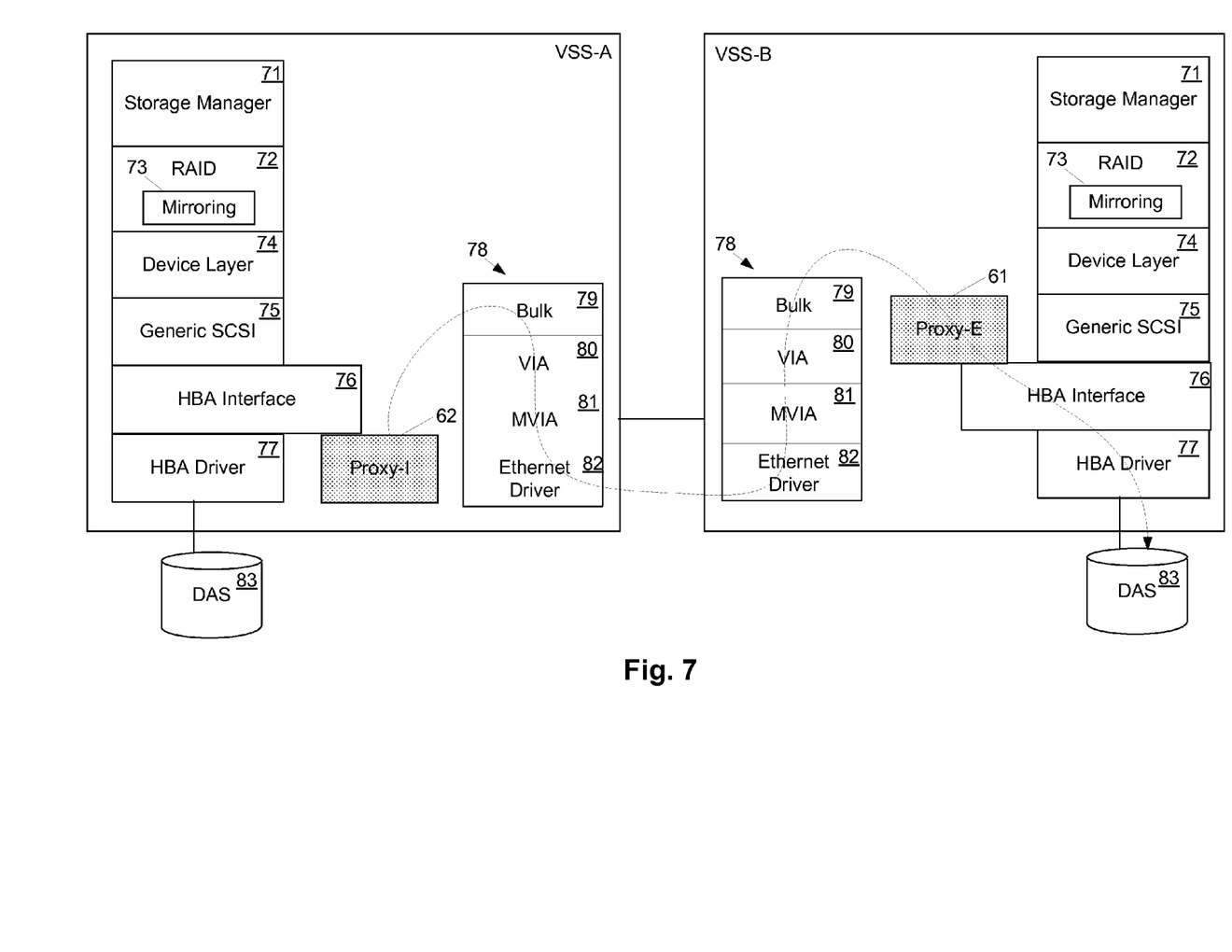
FIG. 7 shows an example of the placement of proxy components in a storage operating system for use in a VSS-HA DAS configuration.

FIG. 7 shows an example of the placement of the two proxy components 61 and 62 in a storage operating system for use in a VSS-HA DAS configuration. As shown, the storage stack employed in a VSS includes, under the storage manager 71 (going from high level to low level), a RAID layer 72 which includes a RAID mirroring layer 73, a storage driver layer, 74 a generic SCSI layer 75, a generic HBA interface layer 76 and an HBA driver layer 77. The HBA driver layer 77 provides the functional connection to the local storage devices 83. The HA interconnect stack 78 includes a bulk layer 79 at its top level, which provides the capability to transfer large amounts of data (i.e., several buffers at a time, where the buffer size can be, for example, 4 KB) over the interconnect. The bulk layer 79 operates on top of a conventional virtual interface architecture (VIA) layer 80, which operates on top of an emulated VIA (MVIA) layer 81, which operates on top of an Ethernet-based driver layer 82 (e.g., e1000).

Proxy-I operates logically just below the HBA interface layer 76, whereas proxy-E operates logically just above the HBA interface layer 76. It can be seen that both proxy-I and proxy-E operate logically below the RAID layer. Although not illustrated as such in FIG. 7 for simplicity, each VSS would normally include an instance of proxy-E 61 and an instance of proxy-I 62 (i.e., FIG. 7 only shows remote device access in one direction, whereas a CFO configuration would normally involve remote device access in both directions).

A proxy-I instance can be connected with multiple remote instances of proxy-E and vice versa. This enables a configuration where a VSS can import storage devices from multiple other VSSs or export storage devices to multiple other VSSs. Such a configuration, as discussed below, is advantageous in achieving CFO.

In one embodiment, a set of SCSI based on-wire commands is defined between proxy-I and proxy-E as follows:

Data plane commands, such as SCSI_SEND and SCSI_CALLBACK, are used for packaging SCSI requests and responses, respectively, over the network.

Control plane commands, such as DEVICE_LIST, DEVICE_REGISTER, and DEVICE_DEREGISTER, are used for exchanging information about the list of exportable disk devices, and about specific events such as addition or removal of disks.

Note that proxy-E in the illustrated embodiment is actually layered on top of the HBA interface layer 76. Thus, the solution is not dependent on the specific HBA driver 77 used. Moreover, the proxy mechanism can be made available very early in the boot sequence of the storage server. This enables arbitrary placement of storage devices across VSSs, as further explained below.

CFO Fencing Mechanism

It is desirable to be able to use an existing HA mechanism, such as ONTAP CFO, in providing a DAS based VSS-HA solution. With that in mind, before discussing system configuration and device placement for DAS based VSS-HA, it is useful to consider a CFO mechanism in use today called "mailbox". A CFO mailbox is a data structure (or data structures) stored at well-known locations (outside of the storage manager and RAID areas) on select storage devices (e.g., disks) in the root aggregate (a separate aggregate which contains only system information). If the root aggregate is mirrored, then there is at least one mailbox storage device on each plex. A CFO cluster has two root aggregates, and thus two mailbox instances, one belonging to each CFO node. From the viewpoint of a CFO node, the mailbox instance on its root aggregate is the primary instance, and the mailbox instance on its partner's root aggregate is the backup instance. Each mailbox instance has a STATE field associated with it that indicates which CFO node owns that root aggregate.

Now consider what happens when a conventional CFO node (such as a storage controller implementing ONTAP CFO from NETAPP) wants to take over its partner. Before the takeover can proceed, the node performing the takeover needs to "fence off" its partner to avoid errors, data corruption, etc. In one conventional CFO system, part of this fencing off process is updating the mailbox state on the partner node's storage devices, i.e., updating STATE on the partner node's mailbox instance. However, if all the partner node's mailbox storage devices are not accessible, the takeover fails.

Essentially, a booting CFO node looks at the state of both mailbox instances to determine what to do, i.e., to determine whether it should boot normally (serve only its own storage), boot and takeover its partner (serve both its own storage and its partner's storage), or just wait for giveback (because the partner node has taken-over). In this way, the mailbox mechanism functions as a persistent fencing mechanism, relying on the fact that the mailbox states will be properly updated during takeover/giveback.

One possible configuration for VSS-HA in a DAS environment would be for two VSSs to mutually proxy their storage to each other, so that a conventional RAID-level mirroring mechanism could replicate data across physical hosts. In such a configuration, a physical host failure or VSS failure is fundamentally indistinguishable from a network partition, where all network links between the two physical hosts are inoperative. From the viewpoint of a VSS, both scenarios seem identical—in both scenarios there is simultaneous loss of access to the partner and remote storage. This raises the possibility of a so-called "split-brain" scenario, an undesirable situation in which a network partition has occurred and each VSS has taken over the other VSS.

Thus, to achieve automatic takeover without experiencing "split brain", a third entity can be used to help disambiguate a host/VSS failure from a link failure. This third entity should be located in a different failure domain than the two VSSs (at least on a different physical machine).

Consider what makes automatic takeover ill-advised in a two-node VSS-HA configuration: As discussed above, with the conventional CFO mechanism, to perform takeover a CFO node needs to update the state of the backup mailbox instance, all mailbox storage devices owned by its partner node. In a conventional RAID-level mirroring configuration, there is at least one mailbox storage device in each plex. When a network partition or a VSS/host failure occurs, the partner mailbox storage device(s) in one of the plexes becomes inaccessible, and takeover cannot proceed. Therefore, in a VSS-HA approach (DAS or otherwise), failure of a VSS should not cause loss of access to that VSS's storage devices.

With the above discussion providing context, a specific VSS configuration and placement of storage devices for DAS-based VSS-HA shall now be discussed.

VSS Configuration and Storage Device Placement

Figure 8:
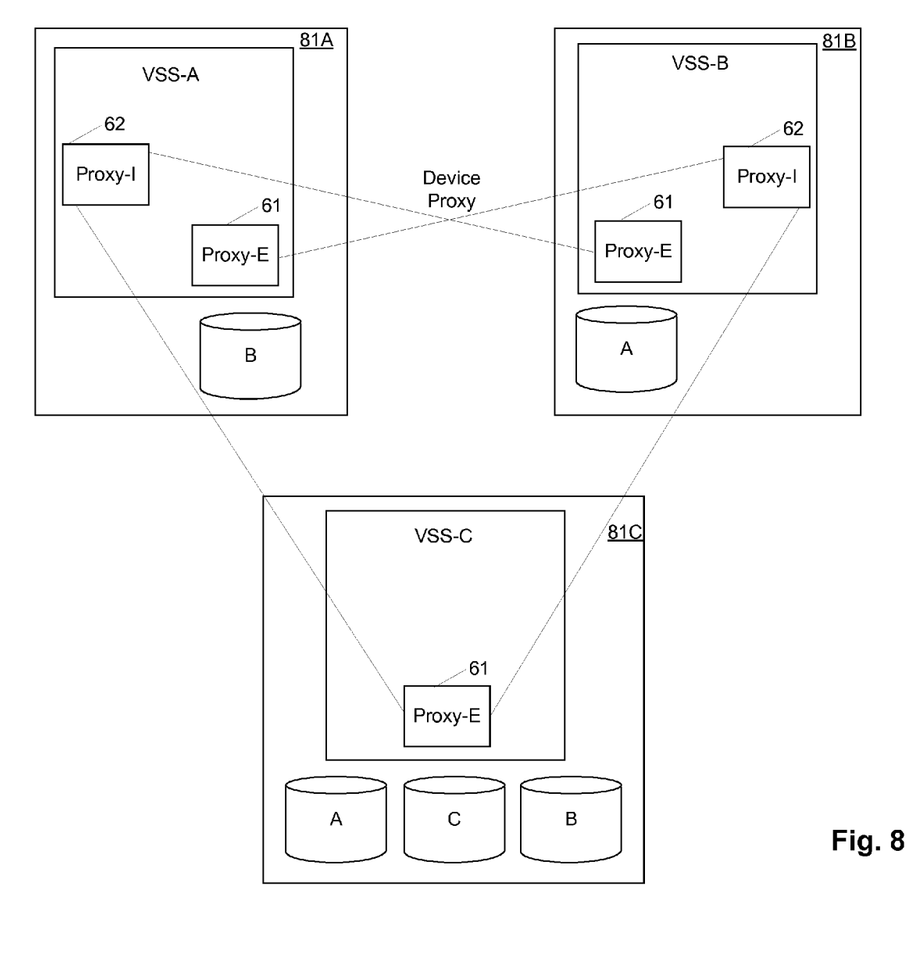
FIG. 8 illustrates a three-node VSS-HA DAS configuration in which automatic takeover is possible upon physical server or VSS failure, with no changes to a conventional CFO mechanism.

In view of the above concerns, in the technique introduced here a VSS and the storage devices that it "owns" are not co-located on the same physical host. A simple DAS-based VSS-HA configuration which meets this criterion is shown in FIG. 8, in which a third VSS, VSS-C, is added, whose job is merely to export storage devices to the other two CFO VSSs, VSS-A and VSS-B. In FIG. 8, VSS-A owns DAS storage devices A located on physical hosts 87B and 87C, VSS-B owns DAS storage devices B located on physical hosts 87A and 87C, and VSS-C owns DAS storage devices C located on physical host 87C. This configuration is, therefore, a three-node DAS-based VSS-HA configuration in which automatic takeover is possible upon physical server failure or VSS failure, with no changes to the conventional CFO mechanism (e.g., ONTAP CFO) being necessary.

Note that with this configuration, when VSS-A fails, VSS-B can perform a takeover because all of VSS-A's mailbox storage devices are still accessible (although VSS-B itself loses a plex). In actual deployments, VSS-C can be provisioned with lower amount of CPU and memory resources, as compared to the other two VSSs.

Figure 9:
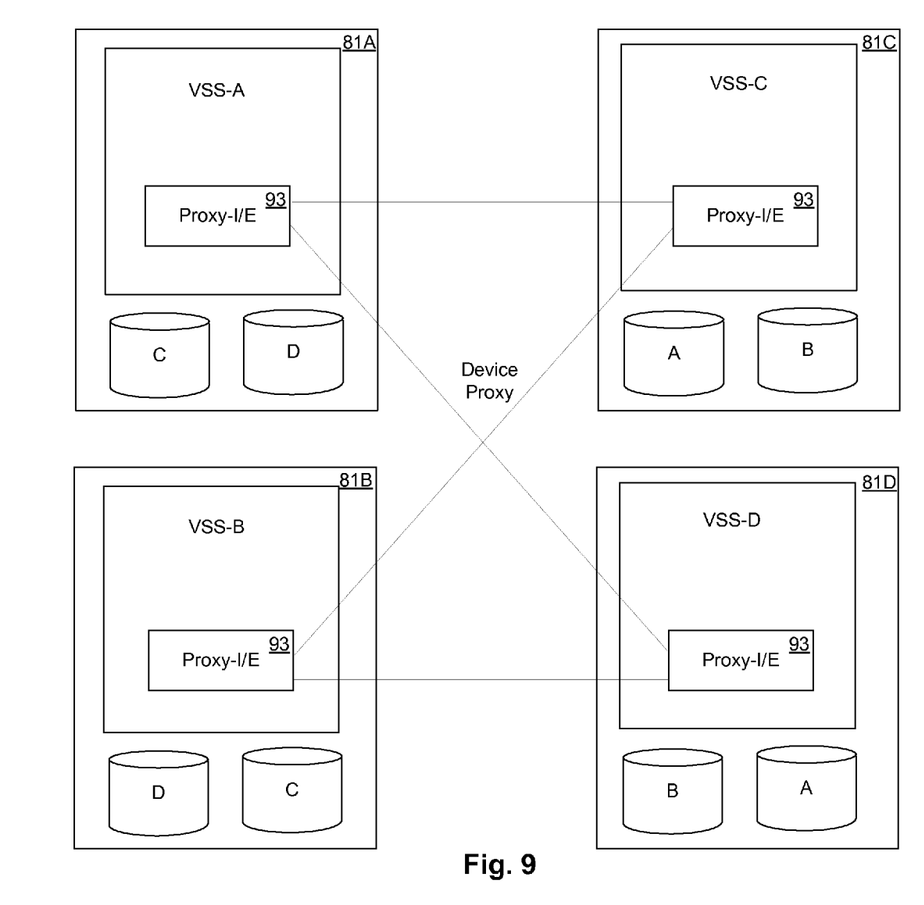
FIG. 9 illustrates a four-node VSS-HA DAS configuration in which automatic takeover is possible upon physical server or VSS failure, with no changes to a conventional CFO mechanism.

Another possibility is to use four physical machines, as shown in FIG. 9. In FIG. 9, VSS-A and VSS-B are in a CFO relationship with each other and use storage devices exported from VSS-C and VSS-D. Similarly, VSS-C and VSS-D are in a CFO relationship with each other and use storage devices exported from VSS-A and VSS-B. In FIG. 9, each proxy-I/E 93 represents both a proxy-I and a proxy-E. FIG. 9, therefore, illustrates a four-node VSS-HA DAS configuration where there are two CFO instances and automatic takeover upon physical server failure or VSS failure is possible in both instances.

A significant advantage of the approaches illustrated in FIGS. 8 and 9 is that they require no modifications to the existing CFO mechanism and require no additional external software that adds complexity.

Figure 10:
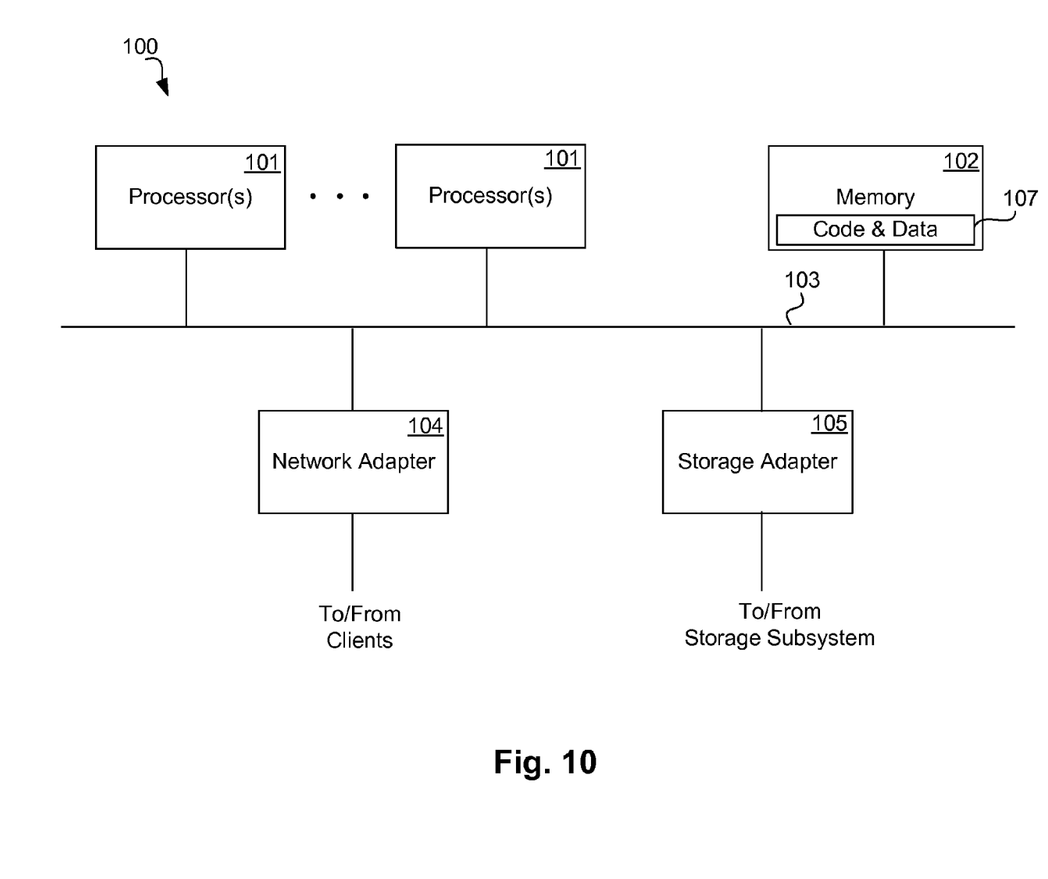
FIG. 10 is a high-level block diagram showing the architecture of a storage controller that can implement a storage server such as described herein.

FIG. 10 is a high-level block diagram showing the architecture of a storage controller that can implement a storage server such as described herein. The storage controller 100 in the illustrated embodiment includes multiple processors 101 and memory 102, each coupled to an interconnect 103. The interconnect 103 is an abstraction that represents any one or more separate physical buses, point-to-point connections, or both connected by appropriate bridges, adapters, or controllers. The interconnect 103, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processors 101 may be or include the CPUs of the storage controller 100 and, thus, control the overall operation of the storage controller 100. In certain embodiments, the processor(s) 101 accomplish this by executing software or firmware stored in memory, such as memory 102. Each of the processors 101 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 102 is or includes the main memory (working memory) of the storage controller 100. The memory 102 represents any form of random access memory (RAM), read-only memory (ROM), flash memory (as discussed above), or the like, or a combination of such devices. In use, the memory 102 may contain, among other things, software and/or firmware code and data 107 for use in implementing the storage operating system and/or the deduplication engine, including the sorting technique introduced below.

Also connected to the processors 101 through the interconnect 103 are a network adapter 104 and a storage adapter 105. The network adapter 104 provides the storage controller 100 with the ability to communicate with remote devices, such as clients, over a network and may be, for example, an Ethernet adapter or Fibre Channel adapter. The storage adapter 105 allows the storage controller 100 to access its associated storage subsystem and may be, for example, a Fibre Channel adapter or a SCSI adapter.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
replicating data between storage of a first server and storage of a second server configured as high-availability (HA) storage partners, wherein the storages of the first server and the second server are not shared between the first server and the second server, by using a sub-RAID level proxy in each of the first server and the second server to proxy data mirroring communications between the first server and the second server; and
using a third host external to the first server and the second server to export direct attached storage (DAS) storage of the third host to the first server and the second server, wherein local DAS storage of a physical machine that hosts the first server is not owned by the first server, and wherein local DAS storage of a physical machine that hosts the second server is not owned by the second server.

2. A method as recited in claim 1, wherein at least one of the storages of the first server and the second server is DAS storage.

3. A method as recited in claim 1, wherein HA storage owned by the first server comprises DAS storage located on a different physical host from the first server, and HA storage owned by the second server comprises DAS storage located on a different physical host from the second server.

4. A method as recited in claim 3, wherein the HA storage owned by the first server is distributed between the second server and the third host, and the HA storage owned by the second server is distributed between the first server and the third host.

5. A method as recited in claim 1, further comprising:
using a sub-RAID level proxy in each of the first server, the second server and the third host, to proxy data communications between hosts.

6. A method as recited in claim 1, wherein using a sub-RAID level proxy comprises using a sub-RAID level import proxy and a sub-RAID level export proxy in each of the first server and the second server, to proxy data communications between the first server and the second server.

7. A method as recited in claim 1, wherein the first server and the second server comprise, respectively, a first virtual storage server and a second virtual storage server.

8. A method comprising:
operating a virtual storage server (VSS) in a host processing system as part of a high-availability (HA) storage cluster, by mirroring data from a local direct attached storage (DAS) storage set of the host processing system to an external processing system configured as an HA storage partner of the VSS, wherein the VSS includes a RAID layer;
exporting a storage device of the local DAS storage set to the HA storage partner by using a proxy element in the VSS logically below the RAID layer; and
importing a storage device of a remote DAS storage set to the VSS by using a proxy element in the VSS logically below the RAID layer.

9. A method as recited in claim 8, wherein the remote DAS storage set is included is included in the external processing system configured as the HA storage partner.

10. A method as recited in claim 8, wherein the remote DAS storage set is included in a processing system other than said external processing system and said host processing system.

11. A method as recited in claim 8, wherein the local DAS storage set is owned by a processing system other than said host processing system.

12. A method as recited in claim 11, wherein the local DAS storage set is owned by the external processing system configured as the HA storage partner.

13. A method as recited in claim 11, wherein the local DAS storage set is owned by a third processing system separate from the host processing system and the external processing system.

14. A high-availability (HA) storage cluster comprising:
a plurality of physical hosts, including at least two physical hosts configured to operate as HA storage partners, each of the plurality of physical hosts including a storage server and direct attached storage (DAS) storage, wherein at least a portion of the DAS storage in each of the physical hosts is owned by and exported to a storage server in another one of the physical hosts, each of storage servers being configured to mirror data onto DAS storage on another one of the physical hosts, each of the storage servers including a sub-RAID level proxy to proxy data mirroring communications with another one of the storage servers.

15. A HA storage cluster as recited in claim 14, wherein the plurality of physical hosts comprise:
a first physical host including a first storage server and a first DAS storage set;
a second physical host including a second DAS storage set and a second storage server configured to operate as an HA cluster partner of the first storage server, the second DAS storage being owned by the first storage server, the first DAS storage being owned by the second storage server; and
a third physical host including a third DAS storage set owned by the first storage server and a fourth DAS storage set owned by the second storage server.

16. A HA storage cluster as recited in claim 14, wherein the plurality of physical hosts comprises:
a first plurality of physical hosts configured to operate in a cluster-failover relationship with each other, including
a first physical host including a first storage server and first and second DAS storage sets;
a second physical host including a second storage server and third and fourth DAS storage sets; and
a second plurality of physical hosts configured to operate in a cluster-failover relationship with each other, including
a third physical host including a third storage server and fifth and sixth DAS storage sets; and
a fourth physical host including a fourth storage serve and seventh and eighth DAS storage sets;
wherein:
the first and fourth DAS storage sets are owned by and exported to the third storage server;
the second and third DAS storage sets are owned by and exported to the fourth storage server;
the fifth and eighth DAS storage sets are owned by and exported to the first storage server; and
the sixth and seventh DAS storage sets are owned by and exported to the second storage server.

17. A host processing system comprising:
a processor;
a local storage set functionally coupled to the processor, wherein the local storage set is non-shared storage;
a network interface through which to receive over a network, from a storage client, a data access request relating to data stored in the local storage set;
a storage operating system including a mirroring module to mirror data from the local storage set to an external processing system configured as a high-availability (HA) storage partner of the host processing system;
an export proxy configured to operate logically below the mirroring module, to export to the HA storage partner a storage device of the local storage set; and
an import proxy configured to operate logically below the mirroring module, to import and present to the storage operating system an exported storage device of a remote storage set, wherein the remote storage set is non-shared storage.

18. A host processing system as recited in claim 17, wherein at least one of the local storage set and the remote storage set is direct-attached storage (DAS).

19. A host processing system as recited in claim 17, wherein the import proxy in the export proxy are configured to operate logically below a RAID module in the host processing system.

20. A host processing system as recited in claim 17, wherein the mirroring module is included in a RAID module in the host processing system.

21. A host processing system as recited in claim 17, wherein the remote DAS storage set is included is included in the external processing system configured as the HA storage partner.

22. A host processing system as recited in claim 17, wherein the remote DAS storage set is included in a processing system other than said external processing system and said host processing system.

23. A host processing system as recited in claim 17, wherein the local DAS storage set is owned by a processing system other than said host processing system.

24. A host processing system as recited in claim 23, wherein the local DAS storage set is owned by the external processing system configured as the HA storage partner.

25. A host processing system as recited in claim 23, wherein the local DAS storage set is owned by a third processing system separate from the host processing system and the external processing system.

26. A host processing system as recited in claim 17, wherein the storage operating system, the mirroring module, the import proxy and the export proxy are elements of a virtual storage server hosted by the host processing system.

* * * * *

UNITED STATES PATENT AND TRADEMARK OFFICE
CERTIFICATE OF CORRECTION

PATENT NO. : 8,412,672 B1  
APPLICATION NO. : 12/877890  
DATED : April 2, 2013  
INVENTOR(S) : Prashanth Radhakrishnan et al.

Page 1 of 1

It is certified that error appears in the above-identified patent and that said Letters Patent is hereby corrected as shown below:

In the Claims:

At column 11, line 18, in claim 9, "set is included is included in" should instead read --set is included in--.

At column 12, line 37, in claim 19, "the import proxy in the export proxy" should instead read --the import proxy and the export proxy--.

At column 12, line 44, in claim 21, "set is included is included in" should instead read --set is included in--.

Signed and Sealed this  
Fourteenth Day of May, 2013

Teresa Stanek Rea  
*Acting Director of the United States Patent and Trademark Office*